(No Model.) 2 Sheets—Sheet 1.

W. H. AVIS.
MACHINE FOR MAKING CORDAGE.

No. 441,734. Patented Dec. 2, 1890.

Witnesses
H. D. Boyes
W. H. Clapp

Inventor
Walter H. Avis
Per Graham & Riches
Attorneys (No Model.) 2 Sheets—Sheet 2.
W. H. AVIS.
MACHINE FOR MAKING CORDAGE.
No. 441,734. Patented Dec. 2, 1890.
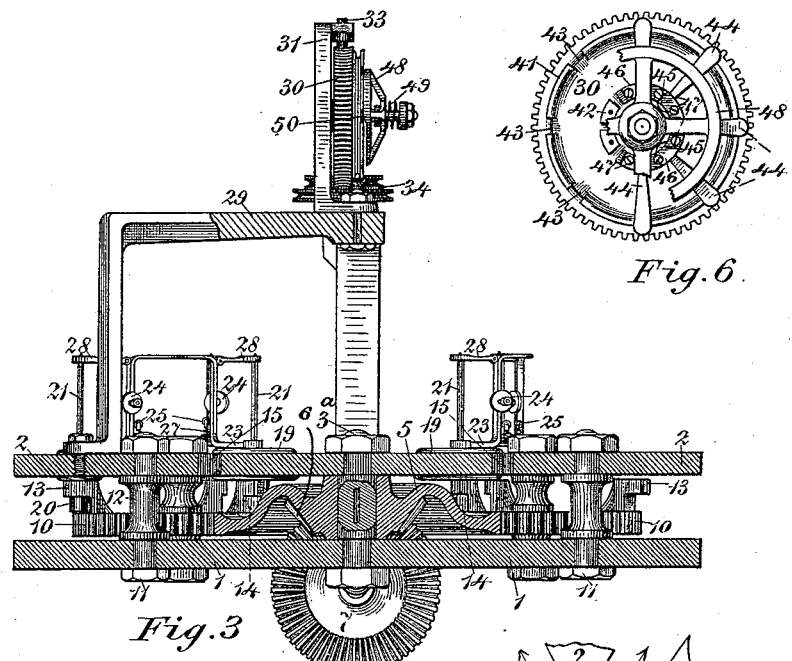
Fig. 3.
Fig. 6.
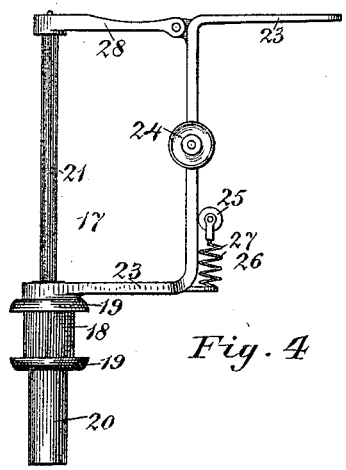
Fig. 4.
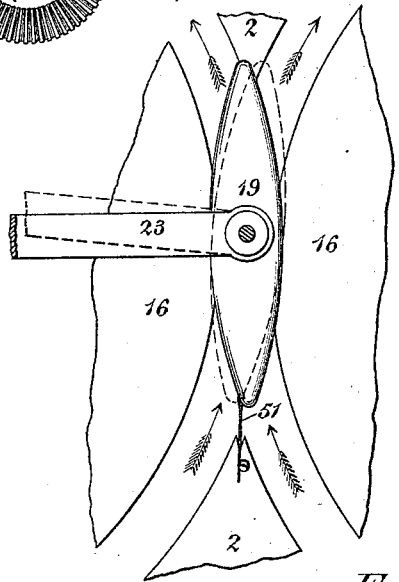
Fig. 5.
Witnesses
H. D. Boyes
W. N. Clapperton
Inventor
Walter H. Avis.
Per Graham & Riches
Attorneys

UNITED STATES PATENT OFFICE.

WALTER H. AVIS, OF TORONTO, CANADA, ASSIGNOR TO ROBERT CHARLES FISHER, OF SAME PLACE.

MACHINE FOR MAKING CORDAGE.

SPECIFICATION forming part of Letters Patent No. 441,734, dated December 2, 1890.

Application filed March 7, 1890. Serial No. 343,062. (No model.)

*To all whom it may concern:*

Be it known that I, WALTER HERBERT AVIS, a subject of the Queen of Great Britain, residing at Toronto, in the county of York and Province of Ontario, Canada, have invented a new and useful Machine for Making Cordage, of which the following is a specification.

The object of my improvement is to provide a very simple and convenient machine for braiding sash and other cords and cords for all objects or uses where a uniformly interlaced or braided surface is desirable and convenient.

Figure 1:
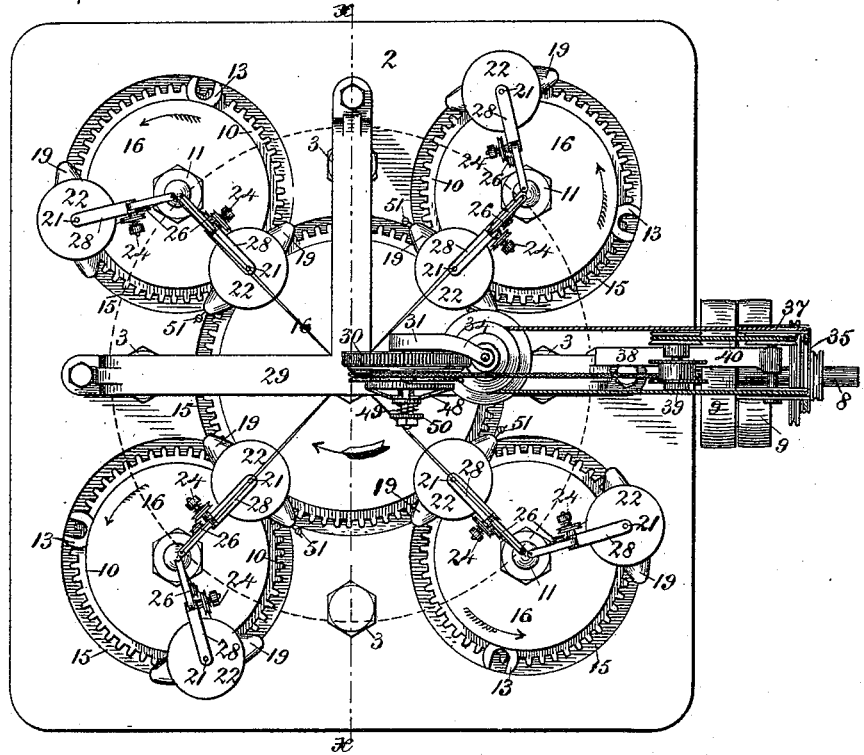
Figure 2:
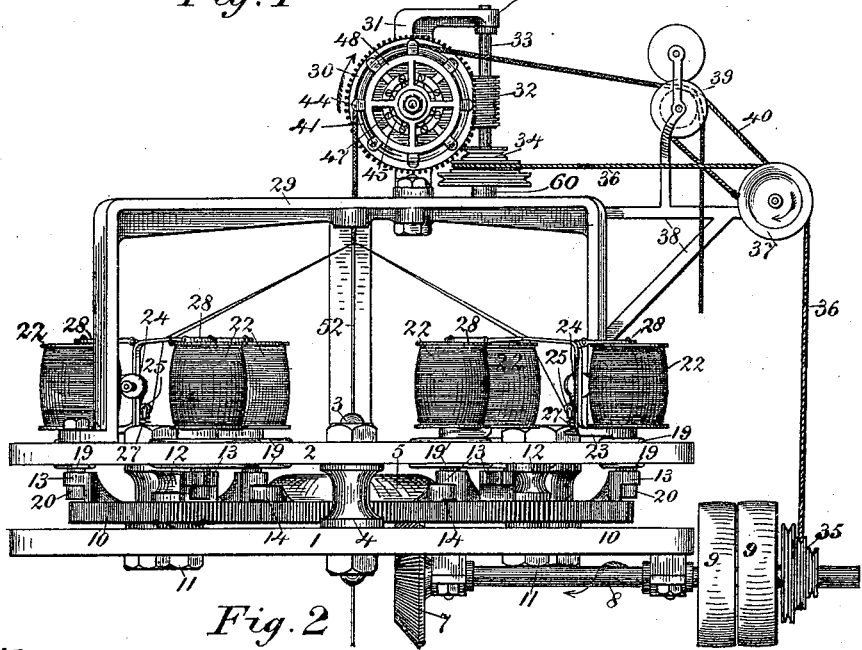

On reference to the accompanying drawings, in which similar letters refer to similar parts throughout the specification, Figure 1 represents a plan of my improved machine; Fig. 2, a front elevation of the same having the legs removed; Fig. 3, a cross-section through the center from front to rear on the line $x\,x$ of Fig. 1; Fig. 4, a detail of one of the carriers alone; Fig. 5, a detail of the switch and the positions of a carrier in taking either of the curves, and Fig. 6 a detail of the feed mechanism.

My improved machine is supported on and by means of suitable legs or supports. (Not illustrated in the drawings.)

The main frame-plate 1 is preferably square and has rigidly supported at a suitable distance above it the upper frame-plate 2, secured by means of the bolts 3, passing through the sleeves 4, and nuts above and below the plates 2 and 1, respectively, secure them in fixed relation to each other. The main plate 1 supports the gear-wheel 5, having teeth around its periphery and a bevel-wheel 6 formed in its under side, meshing with the driving-bevel 7, supported on the end of the shaft 8, supported in suitable bearings and extending along the under side of the main plate 1. Said shaft has supported near the outer end the loose and fast pulleys 9, by which suitable belting from shafting or any usual means drives the machine. At four equidistant points in line between the center and corners of said plate 2 are mounted four similarly-formed, but smaller, gear-wheels 10, secured by bolts 11, passing through suitable or adapted sleeves 12, these gear-wheels 10 meshing with the center gear-wheel 5, which rotates upon the central bolt $3^1$. The said center gear-wheel 5 and the said four gear-wheels 10 intermesh and rotate in a constant proportion of one revolution of the latter wheels 10 to three-quarters of a revolution of the center gear-wheel 5, or the three parts into which the wheels 10 are divided between the receivers 13 on them equal three of the four parts into which the said wheel 5 is divided by its adapted form of receivers 14. This proportion of mesh is hereinafter particularly described and the purpose shown.

The upper frame-plate 2 has circular raceways 15 formed in it over the teeth of the gear-wheels 5 and 10, which divide the said plate 2 into the outer portion, and the five circular disks 16, secured rigidly above the said gear-wheels 5 and 10 by the bolts 11, passing through the spacing collars or sleeves 12, on which the wheels 10 revolve. In the said circular raceways 15 are placed suitably-formed carriers 17, Fig. 4, of the form shown, which are operated at the under side of the plate 2 by receivers 13 and 14 on the said wheels 10 and 5, said receivers 13 and 14 receiving and delivering the carriers 17 alternately between the wheel 5 and the four wheels 10—that is, the carriers 17 are received by the receivers 14 on the center wheel 5 from the receivers on one of the wheels 10, and after being carried one-quarter the circumference of the said wheel 5 are delivered to the next one of the four wheels 10, around which it is carried and delivered back to the center wheel 5, but by the next preceding receiver 14 on the wheel 5 to the one delivering it. Each of said carriers 17 is formed substantially as shown in Fig. 4, having the sliding block 18 as the body, formed with convexly-curved sides and adapted to run in raceways 15, wherein it is maintained erect by the flanges 19, formed at the top and bottom of the block 18, the said flanges 19 fitting closely against the upper and lower sides of the plate 2. Through the center of the slide-block 18 of the carriers 17 a shaft 20 passes, the lower end of which is engaged by the receivers 13 and 14, and its longer portion 21, above slide-block 18, is adapted to hold a suitable bobbin 22, containing a supply of material. The arm 23, projecting at right angles from the shaft 20 21 to a suitable distance clear of the bobbin 22, is then turned vertical and parallel with the said shaft. It has supported on it about mid-height a suitable tension device 24 to hold the thread from the bobbin 22, which is thence carried down around a small roller 25, mounted in a suitable bearing, in which it is held and to which a spiral spring 27 is secured at one end and to the angle of said arm 23 at the other. The said arm 23 is again curved at about a right angle, as shown, to continue outwardly in the same direction as where attached to the slide-block 18. In the upper end of the arm 23 is formed a suitable opening through which the thread from the take-up 26 passes. From a hinge formed at the upper bend of said arm 23 is extended a bar 28 to engage the upper end of the portion 21 of the shaft and hold the bobbin in place.

Securely bolted to the plate 2 is a kneed tripod-frame 29, extending a suitable distance above the carriers 17, and upon which is supported a feed-wheel 30, mounted upon a suitable bracket 31, carried by the frame 29. The feed-wheel 30 is operated by a worm 32, the spiral of which engages the teeth on said feed-wheel 30. The said worm 32 is secured on the vertical shaft 33, which also carries a cone-pulley 34 for producing different speeds. The vertical shaft 33 is supported by and operates at its lower end in a hub 60, formed on the frame 29, and at its upper end in a similar bearing 61 on the bracket 31, carrying the said feed-wheel 30. The cone-pulley 34 is operated by a suitable belt 36 from a similar cone-pulley 35 on the driving-shaft 8, the belt 36 being carried at the angle therein over idle-wheels 37, mounted on the bracket 38, supported by the tripod-frame 29. The said bracket also carries a pair of feed-rollers 39, operated by the belt 40, preferably from a pulley on one of the idle-wheels 37, over which the said belt 36, operating the feed mechanism, already described, is carried.

On the feed-wheel 30 is supported a grip mechanism to seize hold of the cord at the tangent-point with the said grip and carry it round a suitable distance, preferably a quarter-circle, and then release its hold of the cord, which passes thence to the rollers 39. The grip mechanism is composed of a shallow grooved pulley 41, formed on the side of the feed-wheel 30, and an inner concentric and laterally-projecting ring 42 on the side of said feed-wheel 30. Through the outer grooved ring 41 and the inner ring 42 are formed, preferably, eight radial outwardly-enlarging openings 43, into which the same number of arms or levers 44 fit loosely, the inner ends of which levers have each a T-head 45 formed on them to fit against the ring 42 in the wheel 30. The ring 46, secured by suitable screws 47 through it and into the ring 42, maintains the arms 44 from falling out of place. The cam-wheel 48, of the conical form shown in the different figures, is secured on a squared portion on the same central axle as the feed-wheel 30 and has a spiral spring 49 around said axle, pressing against the cam-wheel 48 and holding flexibly the arms 44 against the side of the feed-wheel 30 for a portion of each revolution of the said feed-wheel 30, through a cam 50 or additional thickness formed on the wheel 48, extending about a quadrant of said wheel.

At the frog-angle or the intersection of the circular openings 15 with the central or larger opening is a switch-spring 51, secured as shown and bisecting the angle subtended by the said curves and projecting into the opening, and against which spring the slide-blocks 18 of the carriers 17 come in contact, they being deflected by it to reverse the course or direction of passage which they followed previous to coming in contact with the switch-spring 51, as shown detailed in Fig. 5 by the arrows which indicate the directions.

Having now described my machine in detail when not in action, I will briefly describe the manner in which it performs the braiding. It will be seen that when motion is imparted to the driving shaft 8 in the direction of the arrow the center wheel 5 and the four smaller gear-wheels 10 will run in directions indicated and carry the carriers 17 along with them. Upon collecting the ends of the threads from the bobbins 22 to the center opening in the frame 29 and holding them sufficiently taut when the machine is in motion braiding will take place, and when a core 52 is used it will be braided over. Upon following the motions or the courses of the carriers 17 it will be seen that one thread will be laid on the core 52, and the next thread will overlap it, and then be in turn overlapped by the next succeeding thread or strand while they are being carried round the said core 52, on which they are laid spirally, so that the threads will form a uniformly-checkered covering, provided that the tensions 24 grip equally on the strands which are carried on the circle, (shown dotted in Fig. 1,) except over the centers of the wheels 10, where a slight deviation is necessitated, but provided for by means of the take-up 26 readily yielding to any extra tension required.

The machine illustrated is an eight-strand one. For a twelve-strand machine six receivers on the center wheel and five on the four outer wheels are necessary, while an eighteen-strand machine requires twelve receivers on the center and five on the outer wheels.

Although the machine shown and described is an eight-strand one, yet I do not confine myself to any particular number of strands and may use the other arrangements above mentioned.

Having now described my machine, what I claim as my invention, and desire to secure by Letters Patent, is—

1. The combination, with the lower and upper frame-plates rigidly connected together, the said upper frame-plate having raceways formed therein, of the central gear-wheel, means for driving the same, a series of gear-wheels disposed around said central gear-wheel and meshing therewith, receivers carried by all said gear-wheels, as described, the carriers engaged by said receivers and thereby caused to traverse around the axis of said central gear-wheel and around the axes of the surrounding gear-wheels, and the switch-springs secured at the junctions of the raceways in said upper frame-plate to guide said carriers, substantially as shown, and for the purpose set forth.

2. The combination, with the lower and upper frame-plates rigidly connected together, the said upper frame-plate having circular raceways formed therein, of the central gear-wheel, means for driving the same, a series of gear-wheels disposed around said central gear-wheel and meshing therewith, receivers carried by all said gear-wheels, as described, carriers engaged by said receivers and thereby caused to traverse around the axis of said central gear-wheel and around the axes of the surrounding gear-wheels, and each of said carriers having a bobbin-support, a tension, a take-up, a thread-carrying arm, and a bobbin-retaining arm, substantially as shown and as set forth.

3. The combination, with the lower and upper frame-plates rigidly connected together, the said upper frame-plate having circular raceways therein, of the central gear-wheel, means for driving the same, a series of gear-wheels disposed around said central gear-wheel and meshing therewith, receivers carried by all said gear-wheels, as described, carriers engaged by said receivers and thereby caused to traverse around the axes of said central gear-wheel and around the axis of the surrounding gear-wheels, and the switch-springs secured at the junctions of the raceways in said upper frame-plate to guide said carriers therein, substantially as shown and as set forth.

4. The feeding device composed of the pulley, the radial clamping-arms co-operating therewith, and the spring-pressed cam engaging with said arms, substantially as shown and described.

5. The feeding mechanism comprising the pulley, the radial clamping-arms co-operating therewith, the spring-pressed cam engaging with said arms, and the rollers receiving the cord from the said pulley, substantially as described.

6. The combination, with the lower and upper frame-plates, the said upper frame-plate having circular raceways therein, of the central gear-wheel, means for driving the same, a series of gear-wheels disposed around said central gear-wheel and meshing therewith, receivers carried by all said gear-wheels, as described, carriers engaged by said receivers and thereby caused to traverse around the axis of said central gear-wheel and around the axes of the surrounding gear-wheels, and the feeding mechanism comprising the pulley, the radial clamping-arms co-operating therewith, and the spring-pressed cam engaging with said arms, substantially as shown and described.

7. The combination, with the lower and upper frame-plates rigidly connected together, the said upper frame-plate having circular raceways therein, of the central gear-wheel, means for driving the same, a series of gear-wheels disposed around said central gear-wheel and meshing therewith, receivers carried by all said gear-wheels, as described, carriers engaged by said receivers and thereby caused to traverse around the axis of said central gear-wheel and around the axes of the surrounding gear-wheels, and the feeding mechanism comprising the pulley, the radial clamping-arms co-operating therewith, the spring-pressed cam engaging with said arms, and the rollers receiving the cord from said pulley, substantially as described and set forth.

8. The combination, with the lower and upper frame-plates rigidly connected together, the said upper frame-plate having circular raceways formed therein, of the central gear-wheel, means for driving the same, a series of gear-wheels disposed around said central gear-wheel and meshing therewith, receivers carried by all said gear-wheels, as described, the carriers engaged by said receivers and thereby caused to traverse around the axes of the surrounding gear-wheels, the switch-springs secured at the junctions of the raceways in said upper frame-plate for guiding said carriers, and the feeding mechanism comprising the pulley, the radial clamping-arms co-operating therewith, the spring-pressed cam engaging with said arms, and the rollers receiving the cord from said pulley, substantially as shown and described.

9. The combination, with the lower and upper frame-plates rigidly connected together, the said upper frame-plate having circular raceways formed therein, of the central gear-wheel, means for driving the same, a series of gear-wheels disposed around said central gear-wheel and meshing therewith, receivers carried by all said gear-wheels, as described, carriers engaged by said receivers and thereby caused to traverse around the axes of the surrounding gear-wheels, said carriers having each a bobbin-support, a tension, a take-up, a thread-carrying arm, and a bobbin-retaining arm, and the feeding mechanism comprising the pulley, the radial clamping-arms co-operating therewith, the spring-pressed cam engaging with said arms, and the rollers receiving the cord from the said pulley, substantially as shown and described.

10. The feeding mechanism comprising the pulley, the radial clamping-arms co-operating therewith, the spring-pressed cam engaging with said arms, the rollers receiving the cord from said pulley, the toothed wheel supporting the pulley and clamping-arms, and the worm-wheel engaging said toothed wheel and carried on a vertical shaft driven to operate said feed mechanism, and the rollers receiving the cord from the said pulley, substantially as shown and described.

11. The feeding mechanism comprising the pulley, the radial clamping-arms co-operating therewith, the spring-pressed cam engaging with said arms, the rollers receiving the cord from said pulley, the toothed wheel supporting the pulley and clamping-arms, the worm engaging said toothed wheel, the vertical shaft carrying said worm, and a cone-pulley thereon driven to operate said pulley and clamping-arms, the rollers receiving the cord from said pulley, the belt operating said cone-pulley and carried over the idler-pulleys, and the cone-pulley driving said cone-pulley on the said vertical shaft and carried on the main driving-shaft, substantially as shown and described.

12. The carrier composed of a flanged body adapted to operate in raceways, a shank whereby it is operated in said raceways, means for holding a bobbin, a tension device to grip the thread, a hinged arm to retain said bobbin, an outwardly-extending thread-carrying arm, and a take-up, substantially as shown and described.

WALTER H. AVIS.

In presence of—
WM. DAVIDSON,
CHARLES H. RICHES.